Patented Jan. 5, 1943

2,307,062

UNITED STATES PATENT OFFICE 2,307,062

SUGAR SIRUP COMPOSITION

Thomas E. Moutray, Industrial City, Mo., assignor to The Universal Royalty and Development Company, St. Joseph, Mo., a corporation of Missouri No Drawing. Application February 6, 1939, Serial No. 254,889

8 Claims. (Cl. 99—6)

My invention relates to sugar sirup compositions, and more particularly to a blend of different kinds of molasses.

While there are three kinds of molasses available for livestock feeding purposes, there are certain objectionable features to the feeding of all of these except cane sugar molasses. It has been found that beet sugar molasses causes digestive disturbances, due to its high alkalinity producing an excessive purgative effect, overcoming advantages existing therein due to cheapness in price and higher sugar content in these molasses, while corn sugar molasses is relatively scarce and expensive and has an undesirable astringent effect. I have discovered that by blending the corn and beet sugar molasses with cane sugar molasses, that is, either making a blend of cane sugar molasses, beet sugar molasses and corn sugar molasses, or a blend of cane sugar molasses and beet sugar molasses, or a blend of cane sugar molasses and corn sugar molasses, the advantages of low price and high sugar content of the beet sugar molasses and the high nutritive value of both beet and corn sugar molasses is retained and the disadvantages existing in these other molasses than cane sugar molasses is avoided, while a product of greater palatability than any of these alone results. I have found that by using a blend of corn sugar molasses and beet sugar molasses, the sugar content and palatability is increased and yet the digestive disturbance caused by beet sugar molasses alone, is avoided.

My invention more particularly consists in increasing the food value in stock feeds by utilizing a blend of two or more molasses together to form a molasses compound. This is obtained by increasing the sugar content of the blend over that of cane sugar molasses when used alone. A blend of corn sugar molasses and cane sugar molasses produces a more palatable flavor than would the corn sugar molasses alone, for example, and produces a product that is more desirable from the standpoint that the physiological effect on the animal's body is better and also as it produces a better balanced ration than is the case with either corn sugar molasses, or cane sugar molasses alone, when used in a molasses feed, which molasses feed, of course, consists of a dry cereal material, which is coated or impregnated with molasses or a blend of molasses.

While the advantages of corn sugar molasses and cane sugar molasses blended together are mentioned above, similar results can be obtained by blending together the other molasses as stated.

Other objects and advantages of my invention will appear as the description thereof proceeds. I desire to have it understood, however, that I do not intend to limit my invention to what is described, except as defined in the claims.

In making up my molasses blends for use in impregnating dry cereal, such as ordinarily used in making molasses feeds, the important object is to increase the food value and avoid the objectionable features that exist in the use of certain of these molasses that are otherwise high in food value. I have found that the best results are obtained by utilizing a blend of 37% corn sugar molasses and 63% cane sugar molasses, but results approximating these desirable results can be obtained by percentages of molasses in the above blend approximating the above mentioned ratio. It is not uncommon to have a sugar or carbohydrate content of 75% to 80%, in corn sugar molasses, the average of such content in corn sugar molasses being between 65% and 75%, while cane sugar molasses contains approximately 50% sugar or carbohydrate, the average being between 45% and 50%. Assuming that the corn sugar molasses has only a 75% sugar or carbohydrate content, it will be obvious that the sugar or carbohydrate content of the blend is very materially increased over that of cane sugar molasses by blending the corn sugar molasses therewith. While two kinds of molasses are difficult to blend ordinarily, I find that by utilizing the method described in the application of Hermann H. Schmidt, Serial No. 163,650, on Method of blending materials and applying blended materials to cereals, a very uniform and substantially permanent blend of any two or more kinds of molasses can be obtained.

A blend of 50% corn sugar molasses and 50% beet sugar molasses has also been found to give good results. As the beet sugar molasses usually contains about 56% carbohydrates or sugars, and sometimes as high as 70%, and the corn sugar molasses approximately 75%, it will be obvious that very high percentages of carbohydrates or sugars can be obtained by this blend, and it has been found that by feeding this blend of molasses in a molasses feed, as above defined, to livestock, the objections to the use of either corn sugar molasses or beet sugar molasses alone are avoided, and the advantages of a more balanced and highly nutritive ration than that of cane sugar molasses, ordinarily utilized for this purpose, are gained.

A blend of molasses that is not quite as high in carbohydrates or sugars, but which is very highly palatable, and desirable from that standpoint, while having a higher sugar or carbohydrate content than cane sugar molasses, is a blend made up of 33% cane sugar molasses, 30% beet sugar molasses and 37% corn sugar molasses. As both the beet sugar molasses and corn sugar molasses have a higher sugar content than cane sugar molasses, such a blend will have a sugar or carbohydrate content considerably higher than cane sugar molasses, and will produce a better molasses for use in making molasses feed than will the cane sugar molasses alone.

Blends of cane sugar molasses and beet sugar molasses can also be used. By utilizing a blend of cane sugar molasses and beet sugar molasses, the objections to beet sugar molasses in causing digestive disturbances are entirely overcome and yet the increased sugar content of the beet sugar molasses is obtained. While a blend of 50% cane sugar molasses and 50% beet sugar molasses gives good results, even higher percentages of beet sugar molasses can be used in proportion to the cane sugar molasses, without causing any undesirable effects on the animals fed with the blend.

While the above proportions are found to be highly desirable and are preferred, other blends of the two or more molasses mentioned above can be made, which will produce similar results. The important feature of the invention is that two or more kinds of molasses, by being blended together, avoid the objectionable features of the one kind of molasses, in the case of either corn sugar molasses or beet sugar molasses, that it would have alone.

It is highly important and preferred, in using corn and beet sugar molasses, that the blending be done without heating the molasses, as the heating of the corn and beet sugar molasses tends to destroy the vitamins in corn and beet sugar molasses. For this reason the method of blending utilized in the above mentioned application is highly desirable and preferable in blending these different kinds of molasses.

What I claim is:

1. A homogeneous liquid molasses composition consisting entirely of molasses and containing cane sugar molasses and a molasses having a higher sugar content than cane sugar molasses, intimately uniformly blended together throughout the mass thereof.

2. A homogeneous liquid molasses feed composition consisting of substantially 37% corn sugar molasses and substantially 63% cane sugar molasses, intimately uniformly blended together throughout the mass thereof.

3. A homogeneous liquid molasses composition consisting entirely of molasses and containing cane sugar molasses, corn sugar molasses and beet sugar molasses, intimately uniformly blended together throughout the mass thereof.

4. A homogeneous liquid molasses feed composition consisting of substantially 33% cane sugar molasses, substantially 30% beet sugar molasses and substantially 37% corn sugar molasses, intimately uniformly blended together throughout the mass thereof.

5. A homogeneous liquid molasses composition consisting entirely of molasses and containing cane sugar molasses and corn sugar molasses intimately uniformly blended together throughout the mass thereof.

6. A homogeneous liquid molasses composition consisting entirely of molasses and containing corn sugar molasses and beet sugar molasses intimately uniformly blended together throughout the mass thereof.

7. A homogeneous liquid molasses composition consisting entirely of molasses and containing cane sugar molasses and beet sugar molasses intimately uniformly blended together throughout the mass thereof.

8. A homogeneous liquid molasses feed composition consisting of substantially 50% beet sugar molasses and substantially 50% cane sugar molasses, intimately uniformly blended together throughout the mass thereof.

THOMAS E. MOUTRAY.